(12) United States Patent
Barnreiter et al.

(10) Patent No.: US 6,205,887 B1
(45) Date of Patent: Mar. 27, 2001

(54) AUTOMATIC ELECTROHYDRAULICALLY CONTROLLED TRANSMISSION

(75) Inventors: Karl Barnreiter, Hitzhofen; Hans-Peter Fleischmann, Stammham; Johann Markl, Nassenfels; Thomas Suchandt, Ingolstadt, all of (DE)

(73) Assignee: Audi AG (DE)

( * ) Notice: Subject to any disclaimer, the term of this patent is extended or adjusted under 35 U.S.C. 154(b) by 0 days.

(21) Appl. No.: 09/102,144

(22) Filed: Jun. 22, 1998

Related U.S. Application Data

(63) Continuation of application No. PCT/EP97/00522, filed on Feb. 6, 1997.

(51) Int. Cl.[7] ............................. F16H 57/02; F16H 59/00
(52) U.S. Cl. ........................................ 74/606 R; 74/335
(58) Field of Search ................................. 74/606 R, 335

(56) References Cited

U.S. PATENT DOCUMENTS

| | | | |
|---|---|---|---|
| 5,403,245 | * | 4/1995 | Watanabe et al. ................ 477/54 |
| 5,709,134 | * | 1/1998 | Ulm ................................ 74/606 R |
| 5,749,060 | * | 5/1998 | Graf et al. ....................... 477/75 X |
| 5,754,969 | * | 5/1998 | Ando et al. .................... 477/120 X |
| 5,845,544 | * | 12/1998 | Huggins et al. ................ 74/606 R |
| 5,845,545 | * | 12/1998 | Braun et al. .................... 74/606 R |
| 5,941,137 | * | 8/1999 | Beer et al. ...................... 74/606 R |

* cited by examiner

Primary Examiner—Charles A Marmor
Assistant Examiner—Ha Ho
(74) Attorney, Agent, or Firm—Lalos & Keegan; Michael N. Lau

(57) ABSTRACT

The present invention is related to an automatic transmission for a vehicle with an electrohydraulic control. More particularly, the hydraulic control unit and the electronic control unit are mounted adjacent relative to each other on a flange at an end of the transmission.

10 Claims, 4 Drawing Sheets

AUTOMATIC ELECTROHYDRAULICALLY CONTROLLED TRANSMISSION

This application is a continuation of PCT/EP97/00522/ filed Feb. 6, 1997.

FIELD OF INVENTION

The invention relates to an automatic transmission with electrohydraulic control, in particular for motor vehicles.

BACKGROUND OF THE INVENTION

In automatic transmissions of this type, especially those of motor vehicles, the hydraulic control unit and various sensors for pressure readings and engine speeds are integrated into the transmission and are connected to externally located control equipment by way of appropriate lines. This entails higher installation and parts costs and some malfunction sensitivity due to potential line interruptions.

SUMMARY OF INVENTION

The object of the invention is to provide for a generic transmission an arrangement of the hydraulic and electronic control units which permits simple and convenient assembly accompanied by use of fewer parts.

The present invention discloses that the hydraulic and electronic control units be mounted adjacent to each other on a flange on an end of the transmission. The hydraulic and electronic control units may accordingly be premounted as a modular unit and then preferably placed in position and fastened without bracing by means of several bolts.

It is expedient for the hydraulic connections leading from the hydraulic control unit into the transmission to be moved to the flange area on the end and to be connected by means of sealing connections.

As a result of mounting on the end, the connecting sleeves fastened to the hydraulic control unit may project directly into channels provided in the drive or driven shaft; that is to say, hydraulic fluid distributed over the shafts may be delivered by the hydraulic control unit directly, with no additional delivery through a line or channel.

In addition, supply lines mounted in the transmission housing by way of sealing sleeves may be connected to corresponding connecting surfaces of the hydraulic control unit. The sealing sleeves compensate for longitudinal extensions and longitudinal tolerances of the supply lines without the danger of leaks, because of their structure disclosed herein specification.

DRAWINGS OF THE INVENTION

An embodiment of the invention is described in detail in what follows. The drawing illustrates in FIG. 1 shows a partial longitudinal section along the driven shaft of the transmission with cover plate and hydraulic and electronic control units of an automatic CVT transmission of a motor vehicle;

WRITTEN DESCRIPTION OF THE INVENTION

Section 10 as shown in FIGS. 1–4 is part of an electrohydraulically controlled CVT transmission with a drive shaft 12 and a driven shaft 14 on which are mounted drive and driven shaft cone disks with adjustable effective diameters and looping means such as a link conveyor mounted so as to permit continuous change in the transmission ratio and comprise transmission means for reversal of the direction of rotation (reverse gear) and hydraulically loadable couplings for starting and reversal of the direction of travel. These transmission components not shown are of conventional, state-of-the-art design.

Figure 4:
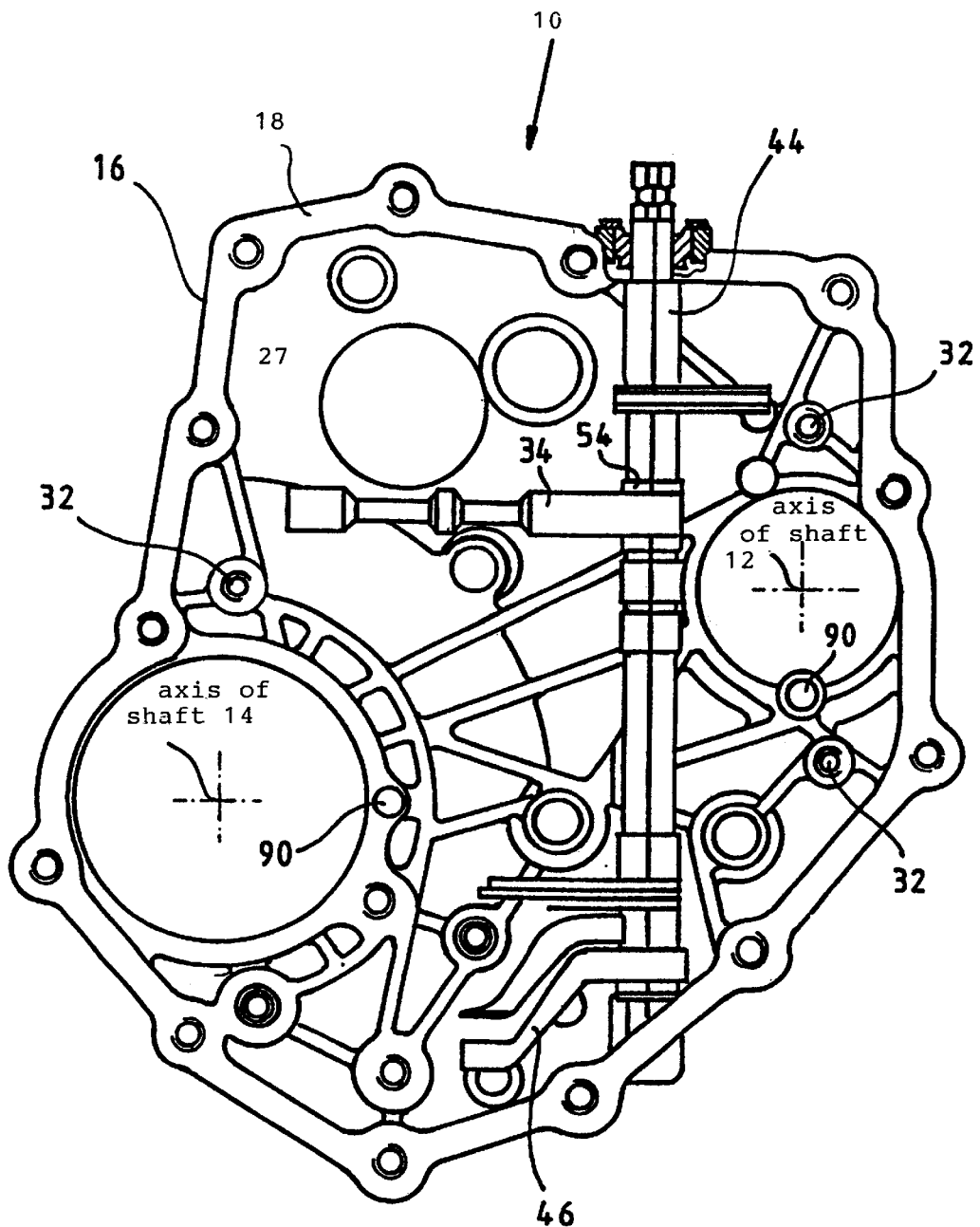
FIG. 4 shows a top view of the end flange on which the hydraulic and electric control units are mounted.

The housing 16 of the transmission terminates at the end opposite the transmission inlet and outlet in a transmission flange 18 on which are positioned adjacent to each other a hydraulic control unit 20 and an electronic control unit 22 are fastened without bracing by means of bolts (not shown) in a 3-point fixture (see FIG. 4, threaded holes 32). In a recessed area 27 of the transmission flange 18 there is mounted a hydraulic pump 29 which is connected directly to the hydraulic control unit 20 and is fastened exclusively to this unit. The hydraulic pump 29 is powered by a drive shaft 26 which is engaged so as not to rotate independently by means of plugin gearing in the gearwheel, not shown, of the hydraulic pump 29.

The hydraulic control unit 20 consists essentially of two channel plates 28, 30, in which are mounted by state-of-the-art methods) control channels, piston valves 34 (see FIG. 3), and magnetic valves (not shown) for controlling the cone pulleys and couplings of the transmission, into which channels hydraulic fluid from the pump 29 is delivered under pressure.

The electronic control unit 22, which is positioned directly on the hydraulic control unit 20, contains in a state-of-the-art layout a CPU with the logical connection circuitry and characteristic storage of the switching programs and corresponding output amplifier for controlling the magnetic hydraulic control valves of the transmission, the vehicle-specific parameters, such as motor management, power requirement (gas pedal position), etc., being introduced from the vehicle by way of a central connection 36 provided on the diskshaped electronic control unit 22 in the form of a connector socket with pertinent plugs and transmission signals (such as speed signal, monitoring signals, diagnostics, etc) being generated.

The central connection 36 extends through an interposed ring seal 38 and then an opening 40 in a cover plate 42 enclosing the hydraulic and electronic control units 20, 22. The cover plate 42 in turn is bolted to the transmission flange 18, with a seal inserted between plate and flange.

In the transmission housing 16 there is also mounted rotatably, by way of a gearshift lever (not shown), a manually actuatable selector shaft 44 (see FIGS. 3 and 4, for example) which actuates the catch of a parking brake (not shown) of the transmission, by way of a projecting arm 46 and rod assembly 48 with a taper adapter 50. Another projecting arm 54 of the selector shaft 44 actuates a relay valve 34 of the hydraulic control unit 20.

Lastly, the selector shaft 44 has mounted on it a plastic injection molded position indicator 56 (see FIG. 1) which interacts with a catch 60 pretensioned by a spring 58 and in each selector position of which a magnetic element 62 is embedded.

The magnetic elements 62 serve the purpose of contact free sensing of the selector positions of the selector shaft 44 on the basis of the Hall effect, a correspondingly formed Hall sensor (not shown) projecting from the electronic control unit 22.

Armlike engine speed sensors 66, 68, which, with transmitter wheels 70, 72 mounted on the drive and driven shafts 12, 14, sense directly the rotational speed of these shafts, extend from the electronic control unit 22 past the hydraulic control unit 20 into the transmission housing. Such sensor control can be accomplished by a state-of-the-art method by the induction or the Hall effect process.

For the purpose of precise positioning of the sensors 66, 68 projecting from the electronic control unit 22 relative to the transmitter wheels 70, 72 or to the position indicator 66, pins 88 which project into corresponding holes 90 in the transmission flange 18 are formed on the free ends of the sensors.

As one connection, the hydraulic control unit 20 is connected to the transmission for control of the taper disks or the continuously adjustable transmission ratio, channels or ring channels 92, 94 (see FIG. 1, with reference to drive shaft 12) in the drive or driven shaft 12, 14, connecting sleeves 96, 98 projecting from the hydraulic control unit 22 being inserted into these channels 92, 94, with sealing piston rings 100 interposed between sleeves and channels. Relative rotation of the components to be sealed is determined by the piston rings 100 used.

Figure 1:
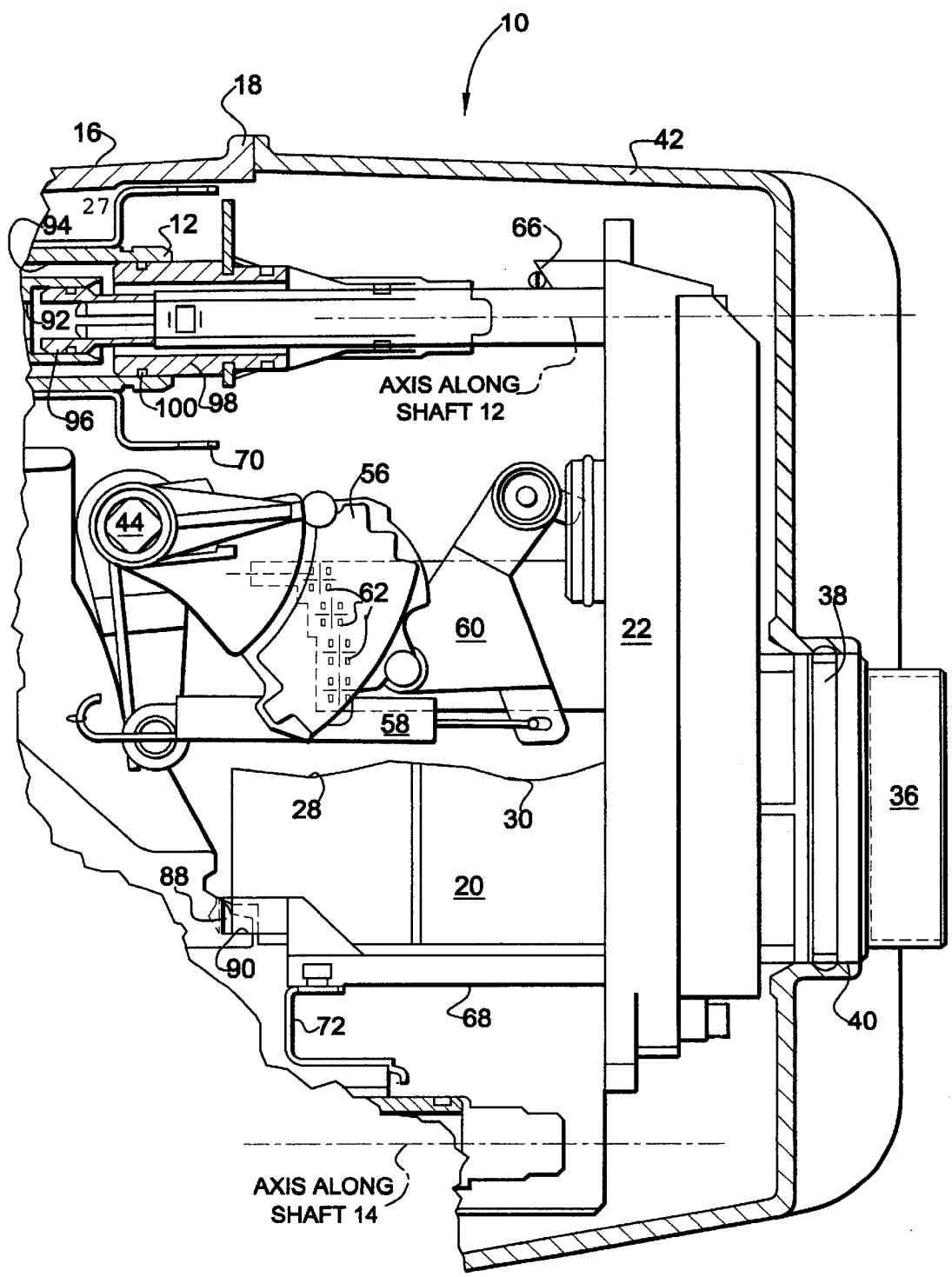
Figure 2:
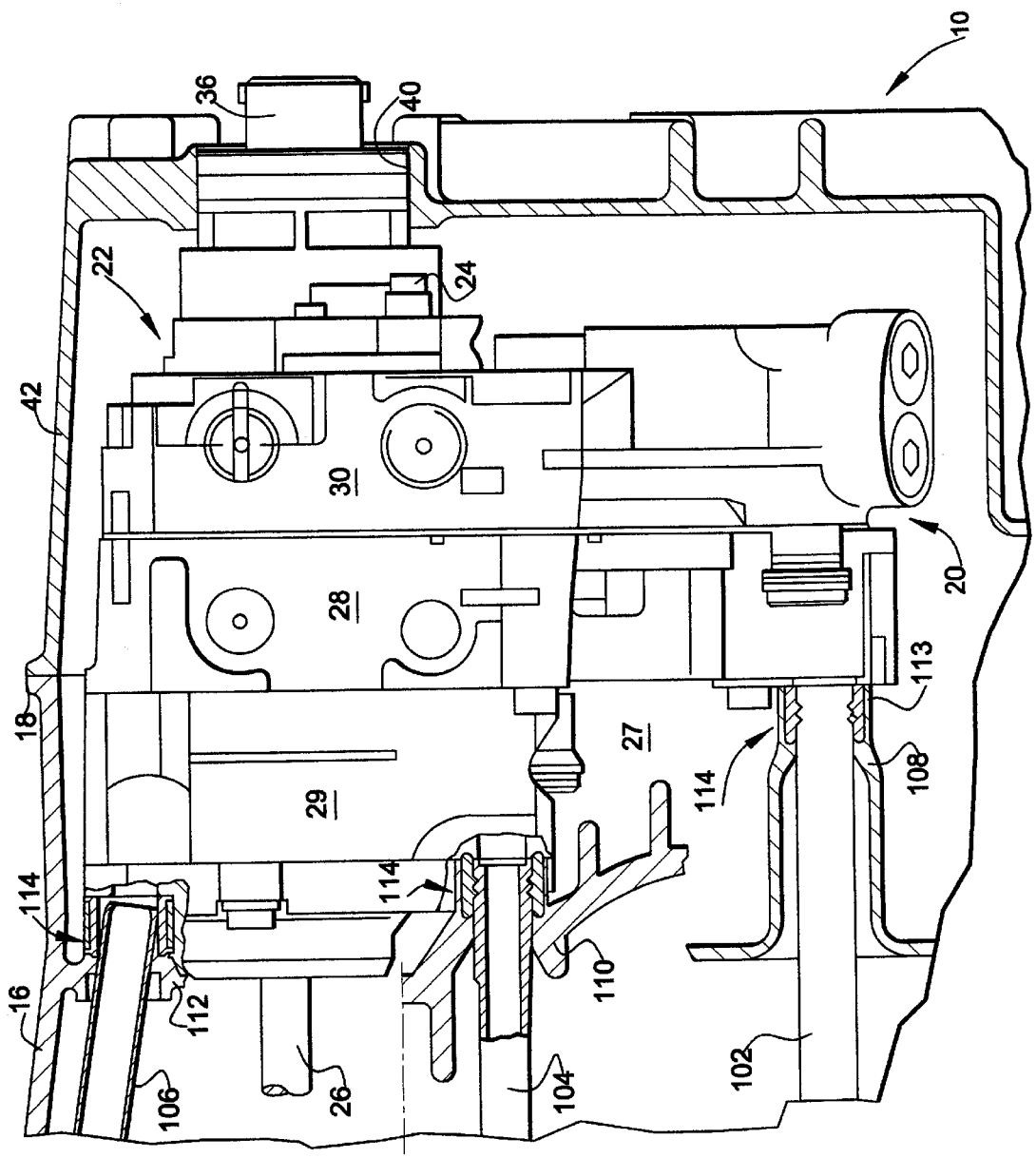
FIG. 2 shows another partial longitudinal section similar to that of FIG. 1 but along several hydraulic line connections between the hydraulic control unit and hydraulically controlled transmission couplings situated in the transmission.
Figure 3:
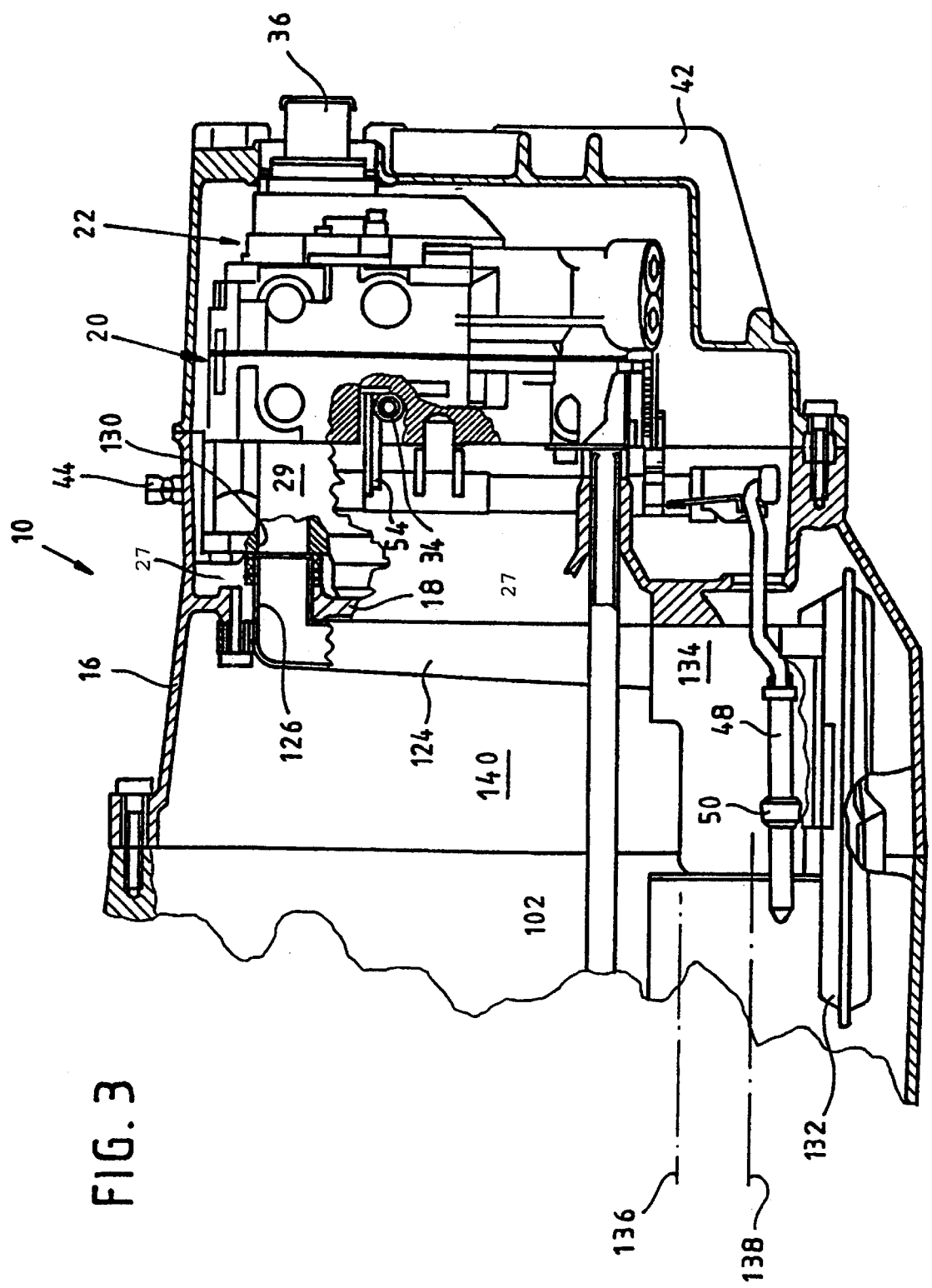
FIG. 3 shows another partial longitudinal section illustrating the mounting of the oil filter of the hydraulic control unit.

In addition, supply lines 102, 104, 106 are provided for hydraulic supply of the couplings; these supply lines extend unconfined in the transmission housing 16 and are inserted into receptacles 108, 110, 112, provided in the transmission housing 6 and extend beyond these receptacles in the direction of the hydraulic control unit 20; a ringshaped sealing sleeve 114 with an external adapter sleeve and an elastic sealing ring with sealing lips extending radially and axially and positioned on each of the supply lines 102, 104, 106, ensure sealing which reliably compensates for tolerances between the connecting surfaces of the hydraulic control unit 20 and the receptacles 108, 110, 112 fastened to the housing and accordingly the supply lines 102, 104, 106. An adaptive sleeve 113 is also shown in FIG. 2.

As is to be seen immediately from the drawing, all sealing and plug connections are oriented parallel to the drive and driven shafts 12, 14, so that all hydraulic and electric connections are effected by simple positioning of a possibly already preassembled control unit consisting of hydraulic pump 29, hydraulic control unit 20 and electronic control unit 22 followed by fastening by tightening the bolts, not shown, in the threaded holes 32. After mounting of the connecting cover 42, all that remains to be done is to connect the central plug on the vehicle side to the corresponding central connection 36.

An intake pipe 124 connected to a connecting sleeve 126 extending at a right angle through the transmission housing 16, by means of a sealing ring mounted tightly on the connection opening 130 in the hydraulic pump 29, is fastened by means of a bolt to the side of the transmission flange 18 facing away from the hydraulic control unit 20.

The intake pipe 124 comprises an oil filter 132 which is fastened to bottom of the transmission housing 16 and which has a partition 134 extending vertically and in the longitudinal direction of the transmission 10.

The partition 134 impounds the hydraulic fluid in the transmission housing 16 and accordingly in the space 140 of the transmission 10 receiving the taper disks, in such a way that, with the taper disk in a geodetically higher position, a sump corresponding to the height of the partition 134 (approximately line 136) is present, while with the taper disk in a geodetically lower position (compare the arrangement of the drive shafts 12, 14) a sump is present approximately corresponding to the positioning of the oil filter 132 or the line 138.

What is claimed is:

1. An automatic electrohydraulically controlled transmission, comprising a drive shaft and a driven shaft which are-actuated by a hydraulic control unit and a pump to change a transmission ratio; and an electronic control unit for controlling a plurality of magnetic valves based on a plurality of input parameters [and engine speed sensing];

wherein the hydraulic and the electronic control units are mounted adjacent to each other on a flange on an end of the transmission.

2. A transmission as described in claim 1, wherein the hydraulic control unit is fastened free of bracing to the transmission flange by a 3-point fastening system.

3. A transmission as described in claim 1, wherein the hydraulic pump is mounted directly on the hydraulic control unit.

4. A transmission as described in claim 1, wherein the hydraulic control unit is mountable on the transmission flange, hydraulic connections ending in the flange area being connected by sealing connections directly to the hydraulic control unit.

5. A transmission as described in claim 1, wherein connecting sleeves fastened on the hydraulic control unit extend directly into channels provided in one of the drive shaft and the driven shaft.

6. A transmission as described in claim 1, wherein supply lines mounted in the transmission housing are supported in receptacles fastened to the housing and are connected by means of sealing sleeves to the hydraulic control unit.

7. A transmission as described in claim 6, wherein the supply lines project beyond the receptacles; wherein the sealing sleeves are positioned on the supply lines.

8. A transmission as described in claim 6, wherein the sealing sleeves have sealing lips extending radially and axially and axial sealing is effected between the connecting surface of the hydraulic control unit and the receptacles fastened to the housing and radial sealing between an adapter sleeve of the sealing sleeves and the supply lines.

9. A transmission as described in claim 1, wherein an intake pipe connected to an oil filter is fastened to a side of the transmission flange facing away from the hydraulic control unit and is connected pressure tight by a connecting sleeve positioned at an angle of 90° extending through the flange to the hydraulic pump.

10. A transmission as claimed in claim 9, wherein the oil filter mounted possibly below the taper disk of the CVT transmission comprises a horizontal partition which determines oil levels in the transmission housing which vary in height as viewed in cross-section.

* * * * *